(12) United States Patent
Uenaka et al.

(10) Patent No.: US 7,720,367 B2
(45) Date of Patent: May 18, 2010

(54) ANTI-SHAKE APPARATUS

(75) Inventors: Yukio Uenaka, Tokyo (JP); Takahiro Ogawa, Saitama (JP)

(73) Assignee: Hoya Corporation, Tokyo (JP)

( * ) Notice: Subject to any disclaimer, the term of this patent is extended or adjusted under 35 U.S.C. 154(b) by 251 days.

(21) Appl. No.: 12/044,085

(22) Filed: Mar. 7, 2008

(65) Prior Publication Data

US 2008/0226277 A1 Sep. 18, 2008

(30) Foreign Application Priority Data

Mar. 13, 2007 (JP) ............................. 2007-062726

(51) Int. Cl.
G03B 17/00 (2006.01)
(52) U.S. Cl. ..................... 396/55; 348/208.7
(58) Field of Classification Search ............... 396/13, 396/55; 318/585
See application file for complete search history.

(56) References Cited

U.S. PATENT DOCUMENTS

| | | | | |
|---|---|---|---|---|
| 2004/0101294 A1* | 5/2004 | Antikidis | ..................... | 396/13 |
| 2005/0270379 A1 | 12/2005 | Seo | | |
| 2006/0067660 A1* | 3/2006 | Seo | ............... | 396/55 |
| 2006/0133786 A1* | 6/2006 | Teramoto | ..................... | 396/55 |
| 2006/0279638 A1* | 12/2006 | Matsuda et al. | .......... | 348/208.7 |
| 2006/0284495 A1 | 12/2006 | Seo et al. | | |
| 2007/0269195 A1 | 11/2007 | Uenaka | | |
| 2008/0012947 A1 | 1/2008 | Uenaka | | |
| 2008/0013937 A1 | 1/2008 | Uenaka | | |
| 2008/0013938 A1 | 1/2008 | Uenaka | | |
| 2008/0013939 A1 | 1/2008 | Ogawa | | |

FOREIGN PATENT DOCUMENTS

JP 2006-71743 3/2006

OTHER PUBLICATIONS

English language Abstract of JP 2006-71743.
U.S. Appl. No. 12/044,073 to Uenaka, filed Mar. 7, 2008.
U.S. Appl. No. 12/044,102 to Uenaka et al., filed Mar. 7, 2008.

* cited by examiner

*Primary Examiner*—W. B. Perkey
*Assistant Examiner*—Dennis Hancock
(74) *Attorney, Agent, or Firm*—Greenblum & Bernstein, P.L.C.

(57) ABSTRACT

An anti-shake apparatus (an image-stabilization apparatus) of a photographing device comprises a movable unit and a controller. The movable unit has an imaging device and is movable and rotatable for an anti-shake operation. The controller controls the movable unit for the anti-shake operation. The controller obtains information regarding a resolution at the edge of a lens that is used for an imaging operation of the imaging device. The controller controls a degree of the anti-shake operation that is performed for correcting hand-shake caused by roll on the basis of the resolution at the edge of the lens.

5 Claims, 8 Drawing Sheets

ANTI-SHAKE APPARATUS

BACKGROUND OF THE INVENTION

1. Field of the Invention

The present invention relates to an anti-shake apparatus for a photographing device, that effectively performs an anti-shake operation for correcting hand-shake caused by roll.

2. Description of the Related Art

An anti-shake apparatus for a photographing device is proposed. The anti-shake apparatus corrects for the effects of hand-shake by moving a hand-shake-correcting lens or by moving an imaging device in a plane perpendicular to the optical axis, in accordance with the amount of hand-shake which occurs during the imaging process.

Japanese unexamined patent publication (KOKAI) No. 2006-71743 discloses an anti-shake apparatus that calculates an anti-shake operation on the basis of a hand-shake angle caused by yaw, a hand-shake angle caused by pitch, and a hand-shake angle caused by roll, and then performs an anti-shake operation on the basis of the hand-shake angles.

However, a characteristic of the lens, in particular, the resolution at the edge of the lens is not considered in the anti-shake operation. When the resolution at the edge of the lens is low, the effect of the anti-shake operation for correcting hand-shake caused by roll can not be visually confirmed.

SUMMARY OF THE INVENTION

Therefore, an object of the present invention is to provide an anti-shake apparatus (an image-stabilization apparatus) that can effectively perform the anti-shake operation for correcting hand-shake caused by roll, inconsideration of the lens characteristics.

According to the present invention, an anti-shake apparatus (an image-stabilization apparatus) of a photographing device comprises a movable unit and a controller. The movable unit has an imaging device and is movable and rotatable for an anti-shake operation. The controller controls the movable unit for the anti-shake operation. The controller obtains information regarding a resolution at the edge of a lens that is used for an imaging operation of the imaging device. The controller controls a degree of the anti-shake operation that is performed for correcting hand-shake caused by roll, on the basis of the resolution at the edge of the lens.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
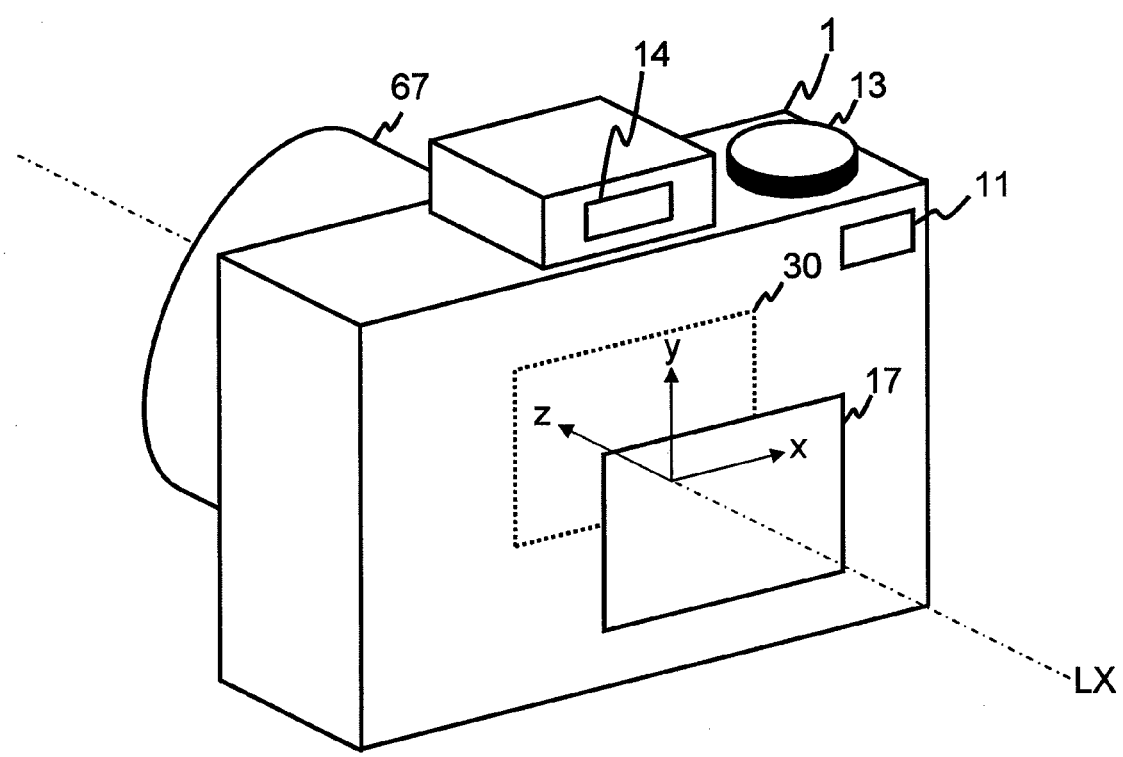
FIG. 1 is a perspective rear view of the embodiment of the photographing device viewed from the back side.

The present invention is described below with reference to the embodiment shown in the drawings. In the embodiment, the photographing device 1 is a digital camera. The camera lens 67 of the photographing device 1 has an optical axis LX.

By way of orientation in the embodiment, a first direction x, a second direction y, and a third direction z are defined (see FIG. 1). The first direction x is the direction perpendicular to the optical axis LX. The second direction y is the direction perpendicular to the optical axis LX and the first direction x. The third direction z is the direction parallel to the optical axis LX and perpendicular to both the first direction x and the second direction y.

Figure 2:
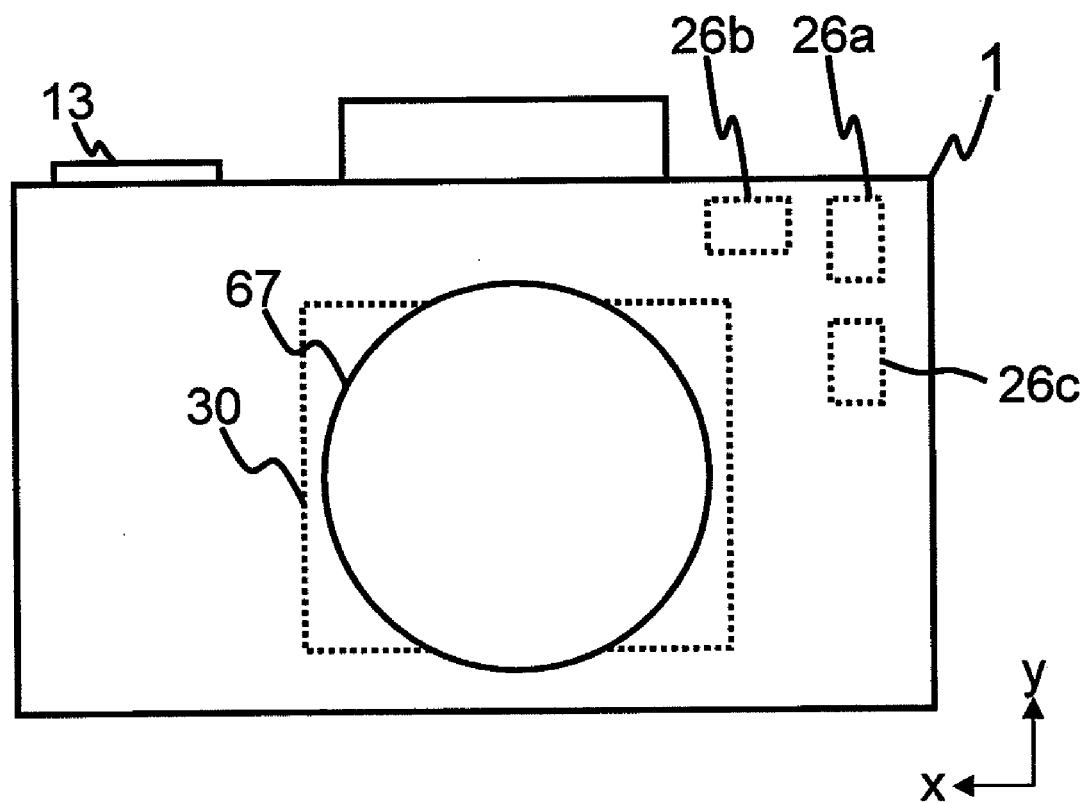
FIG. 2 is a front view of the photographing device.
Figure 3:
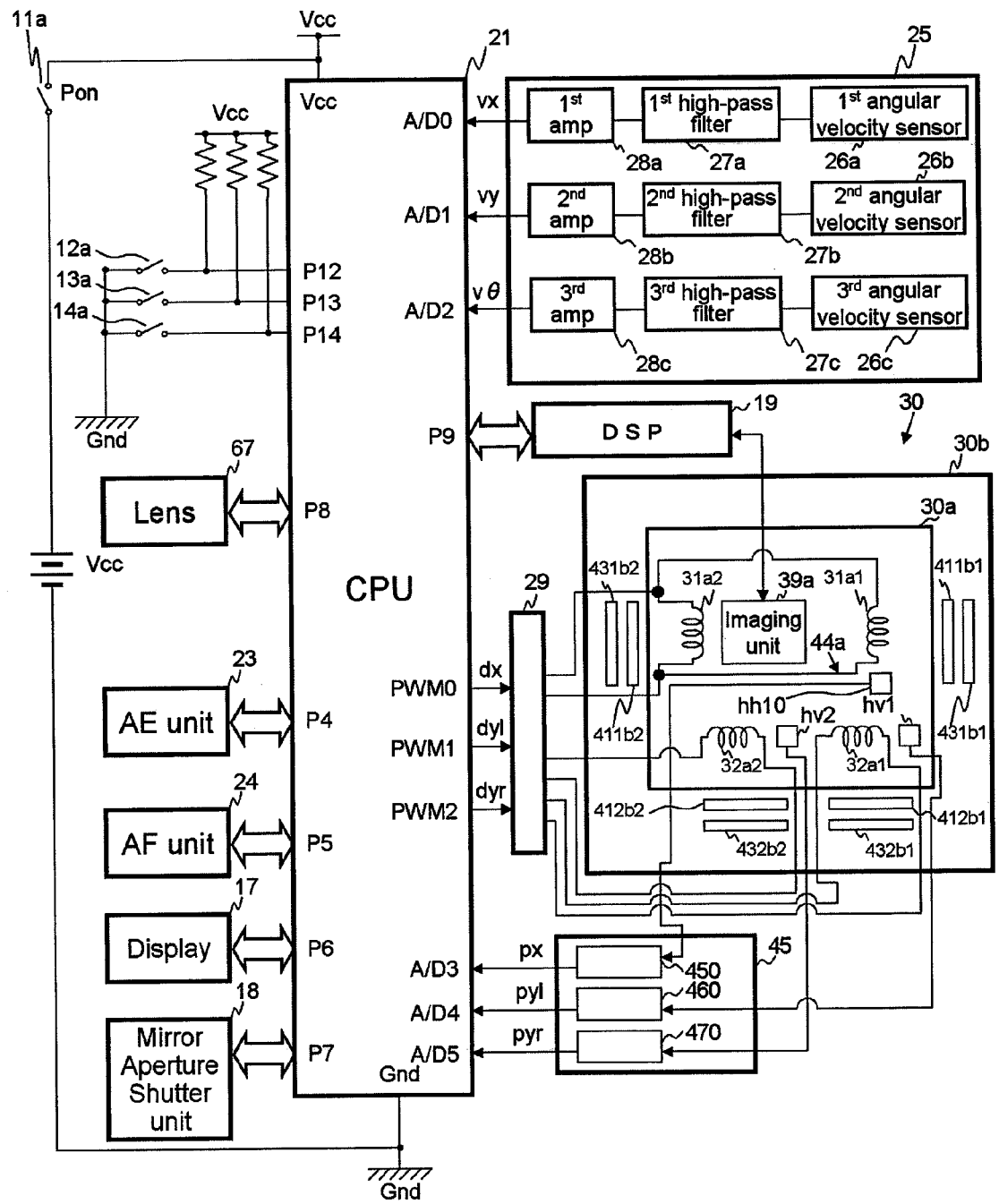
FIG. 3 is a circuit construction diagram of the photographing device.

The imaging part of the photographing device 1 comprises a PON button 11, a PON switch 11a, a photometric switch 12a, a release button 13, a release switch 13a for an exposure operation, an anti-shake button 14, an anti-shake switch 14a, a display 17 such as an LCD monitor etc., a mirror-aperture-shutter unit 18, a DSP 19, a CPU 21, an AE (automatic exposure) unit 23, an AF (automatic focus) unit 24, an imaging unit 39a in the anti-shake unit 30, and a camera lens 67 (see FIGS. 1, 2, and 3).

Whether the PON switch 11a is in the ON state or the OFF state, is determined by the state of the PON button 11, so that the ON/OFF states of the photographing device 1 correspond to the ON/OFF states of the PON switch 11a.

The photographic subject image is captured as an optical image through the camera lens 67 by the imaging unit 39a, and the captured image is displayed on the display 17. The photographic subject image can be optically observed by the optical finder (not depicted).

When the release button 13 is partially depressed by the operator, the photometric switch 12a changes to the ON state so that the photometric operation, the AF sensing operation, and the focusing operation are performed.

When the release button 13 is fully depressed by the operator, the release switch 13a changes to the ON state so that the imaging operation by the imaging unit 39a (the imaging apparatus) is performed, and the captured image is stored.

The CPU 21 performs a release sequence operation after the release switch 13a is set to the ON state.

The mirror-aperture-shutter unit 18 is connected to port P7 of the CPU 21 and performs an UP/DOWN operation of the mirror (a mirror-up operation and a mirror-down operation), an OPEN/CLOSE operation of the aperture, and an OPEN/CLOSE operation of the shutter corresponding to the ON state of the release switch 13a.

The camera lens 67 is an interchangeable lens of the photographing device 1 and is connected to port P8 of the CPU 21. The camera lens 67 outputs information regarding the resolution at the edge of the camera lens 67, and the lens coefficient F, etc., as lens information, stored in a built-in ROM in the camera lens 67, to the CPU 21, when the photometric operation is performed.

The value of the resolution at the edge of the camera lens 67 is the contrast value at the point on the camera lens 67 whose radial distance from the center of the image has a predetermined length, and is obtained from the MTF (Modulation Transfer Function) or a comparable characteristic of the camera lens 67 (for example aperture and focal length).

The DSP 19 is connected to port P9 of the CPU 21, and it is connected to the imaging unit 39a. Based on a command from the CPU 21, the DSP 19 performs the calculation operations, such as the image-processing operation etc., on the image signal obtained by the imaging operation of the imaging unit 39a.

The CPU 21 is a control apparatus that controls each part of the photographing device 1 in its imaging and anti-shake operation (i.e. the image-stabilization operation). The anti-shake operation includes both the movement of the movable unit 30a and position-detection efforts.

Furthermore, the CPU 21 stores the value of the anti-shake parameter SR that indicates whether the photographing device 1 is in the anti-shake mode or not, the value of the release-state parameter RP, the value of the mirror state parameter MP, and the value of the lens resolution parameter RMTF.

The value of the release-state parameter RP changes with respect to the release sequence operation. When the release sequence operation is performed, the value of the release-state parameter RP is set to 1 (see steps S21 to S31 in FIG. 4), otherwise, the value of the release-state parameter RP is set (reset) to 0 (see steps S13 and S31 in FIG. 4).

Figure 4:
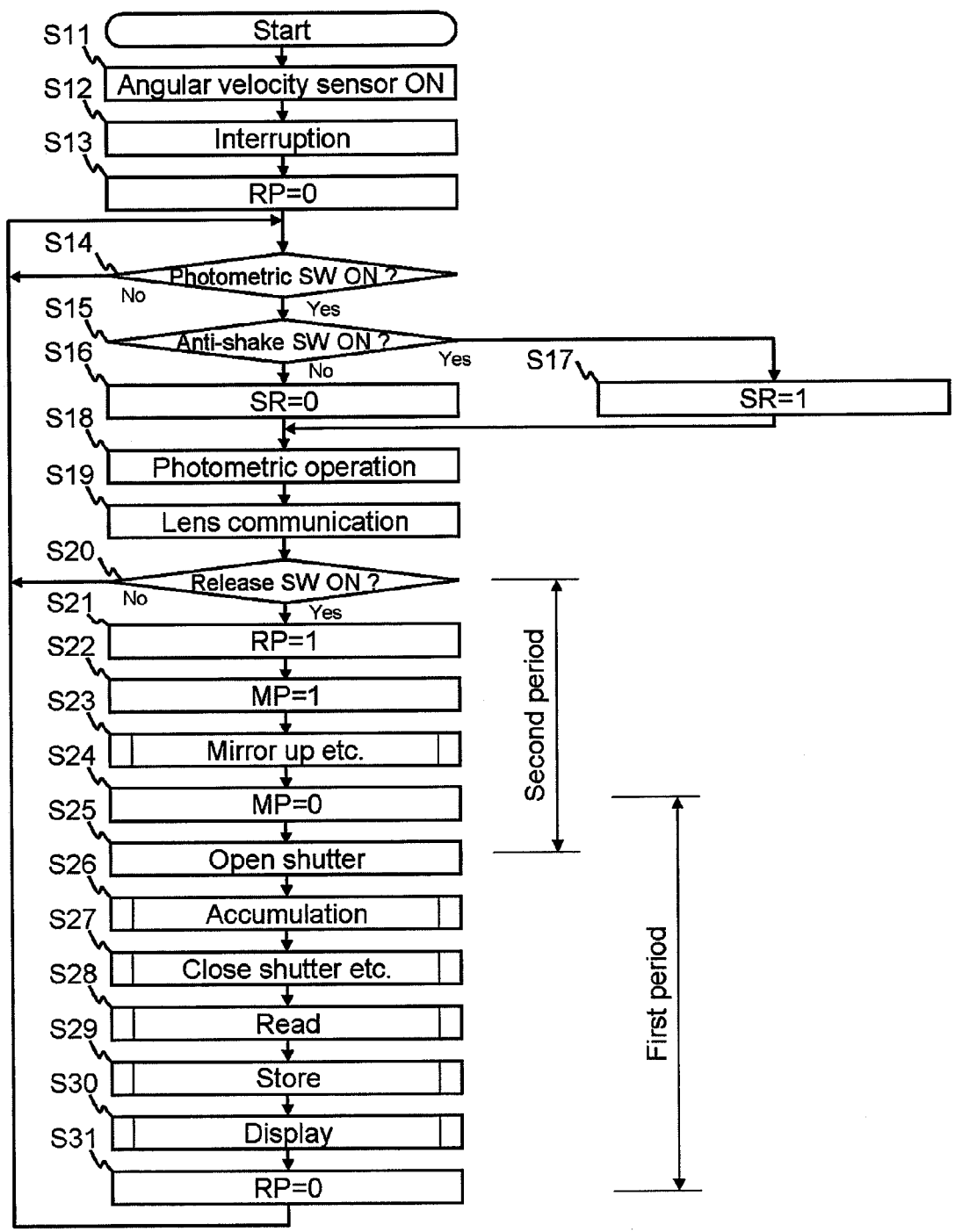
FIG. 4 is a flowchart that shows the main operation of the photographing device.

When the mirror-up operation is being performed before the exposure operation for the imaging operation, the value of the mirror state parameter MP is set to 1 (see step S22 in FIG. 4); otherwise, the value of the mirror state parameter MP is set to 0 (see step S24 in FIG. 4).

Whether the mirror-up operation of the photographing device 1 is finished is determined by the detection of the ON/OFF states of the mechanical switch (not depicted). Whether the mirror-down operation of the photographing device 1 is finished is determined by the detection of the completion of the shutter charge.

The value of the lens resolution parameter RMTF is set to 1 when the value of the resolution at the edge of the camera lens 67 is greater than a threshold value. In this case, the rotational direction component of the position $S_n$, $S\theta_n$, is calculated on the basis of the hand-shake angle caused by roll. In other words, it is calculated based on the third digital displacement angle $K\theta_n$, so that an anti-shake operation for correcting hand-shake caused by pitch, yaw, and roll, is performed.

The value of the lens resolution parameter RMTF is set to 0 when the value of the resolution at the edge of the camera lens 67 is not greater than the threshold value. In this case, the rotational direction component of the position $S_n$, $S\theta_n$, is set to 0 so that the anti-shake operation for correcting hand-shake caused by pitch and yaw is performed without considering the hand-shake caused by roll.

When the resolution at the edge of the camera lens 67 is low, the anti-shake operation for correcting hand-shake caused by roll is not effective even if the anti-shake operation considers the roll. Furthermore, correcting for roll limits the range of movement of the movable unit 30a available for correction of hand-shake caused by pitch and yaw. Therefore, the anti-shake operation for correcting for roll including the rotation of the movable unit 30a is stopped in this case.

Therefore, the CPU 21 controls whether the anti-shake operation is performed for correcting hand-shake caused by roll, on the basis of the resolution at the edge of the camera lens 67.

Furthermore, the CPU 21 stores the values of the first digital angular velocity signal $Vx_n$, the second digital angular velocity signal $Vy_n$, the third digital angular velocity signal $V\theta_n$, the first digital angular velocity $VVx_n$, the second digital angular velocity $VVy_n$, the third digital angular velocity $VV\theta_n$, the digital displacement angle $Kx_n$ (the hand-shake angle caused by yaw), the second digital displacement angle $Ky_n$ (the hand-shake angle caused by pitch), the third digital displacement angle $K\theta_n$ (the hand-shake angle caused by roll), the horizontal direction component of the position $S_n$, $Sx_n$, the vertical direction component of the position $S_n$, $Sy_n$, the rotational direction component (an inclination angle) of the position $S_n$, $S\theta_n$, the first vertical direction component of the first driving point, $Syl_n$, the second vertical direction component of the second driving point, $Syr_n$, the horizontal driving force $Dx_n$, the first vertical driving force $Dyl_n$, the second vertical driving force $Dyr_n$, the horizontal direction component of the position $P_n$ after A/D conversion, $pdx_n$, the first vertical direction component of the position $P_n$ after A/D conversion, $pdyl_n$, the second vertical direction component of the position $P_n$ after A/D conversion, $pdyr_n$, the lens coefficient F, and the hall sensor distance coefficient HSD. The hall sensor distance coefficient HSD is the relative distance between the first vertical hall sensor hv1 and the second vertical hall sensor hv2 in the first direction x.

The AE unit (exposure-calculating unit) 23 performs the photometric operation and calculates the photometric values, based on the subject being photographed. The AE unit 23 also calculates the aperture value and the time length of the exposure operation, with respect to the photometric values, both of which are needed for imaging. The AF unit 24 performs the AF sensing operation and the corresponding focusing operation, both of which are needed for imaging. In the focusing operation, the camera lens 67 is re-positioned along the optical axis in the LX direction.

The anti-shake part (the anti-shake apparatus) of the photographing device 1 comprises an anti-shake button 14, an anti-shake switch 14a, a display 17, a CPU 21, an angular velocity detection unit 25, a driver circuit 29, an anti-shake unit 30, a hall-sensor signal-processing unit 45, and the camera lens 67.

When the anti-shake button 14 is depressed by the operator, the anti-shake switch 14a is changed to the ON state so that the anti-shake operation, in which the angular velocity detection unit 25 and the anti-shake unit 30 are driven independently of the other operations which include the photometric operation etc., is carried out at the predetermined time interval. When the anti-shake switch 14a is in the ON state, in other words in the anti-shake mode, the anti-shake parameter SR is set to 1 (IS=1). When the anti-shake switch 14a is not in the ON state, in other words in the non-anti-shake mode, the anti-shake parameter SR is set to 0 (IS=0). In the embodiment, the value of the predetermined time interval is set to 1 ms.

The various output commands corresponding to the input signals of these switches are controlled by the CPU 21.

The information regarding whether the photometric switch 12a is in the ON state or OFF state is input to port P12 of the CPU 21 as a 1-bit digital signal. The information regarding whether the release switch 13a is in the ON state or OFF state is input to port P13 of the CPU 21 as a 1-bit digital signal. Likewise, the information regarding whether the anti-shake switch 14a is in the ON state or OFF state is input to port P14 of the CPU 21 as a 1-bit digital signal.

The AE unit 23 is connected to port P4 of the CPU 21 for inputting and outputting signals. The AF unit 24 is connected to port P5 of the CPU 21 for inputting and outputting signals. The display 17 is connected to port P6 of the CPU 21 for inputting and outputting signals.

Next, the details of the input and output relationships between the CPU 21 and the angular velocity detection unit 25, the driver circuit 29, the anti-shake unit 30, and the hall-sensor signal-processing unit 45 are explained.

The angular velocity detection unit 25 has a first angular velocity sensor 26a, a second angular velocity sensor 26b, a third angular velocity sensor 26c, a first high-pass filter circuit 27a, a second high-pass filter circuit 27b, a third high-pass filter circuit 27c, a first amplifier 28a, a second amplifier 28b, and a third amplifier 28c.

The first angular velocity sensor 26a detects the angular velocity of rotary motion of the photographing device 1 about the axis of the second direction y (the yaw). In other words, the first angular velocity sensor 26a is a gyro sensor that detects the yaw angular velocity.

The second angular velocity sensor 26b detects the angular velocity of rotary motion of the photographing device 1 about the axis of the first direction x (the pitch). In other words, the second angular velocity sensor 26b is a gyro sensor that detects the pitch angular velocity.

The third angular velocity sensor 26c detects the angular velocity of rotary motion of the photographing device 1 about the axis of the third direction z (the roll). In other words, the third angular velocity sensor 26c is a gyro sensor that detects the roll angular velocity.

The first high-pass filter circuit 27a reduces the low-frequency component of the signal output from the first angular velocity sensor 26a, because the low-frequency component of the signal output from the first angular velocity sensor 26a includes signal elements that are based on null voltage and panning motion, neither of which are related to hand-shake.

Similarly, the second high-pass filter circuit 27b reduces the low-frequency component of the signal output from the second angular velocity sensor 26b, because the low-frequency component of the signal output from the second angular velocity sensor 26b includes signal elements that are based on null voltage and panning motion, neither of which are related to hand-shake.

Likewise, the third high-pass filter circuit 27c reduces the low-frequency component of the signal output from the third angular velocity sensor 26c, because the low-frequency component of the signal output from the third angular velocity sensor 26c includes signal elements that are based on null voltage and panning motion, neither of which are related to hand-shake.

The first amplifier 28a amplifies the signal representing the yaw angular velocity, whose low-frequency component has been reduced, and outputs the analog signal to the A/D converter A/D 0 of the CPU 21 as a first angular velocity vx.

The second amplifier 28b amplifies the signal representing the pitch angular velocity, whose low-frequency component has been reduced, and outputs the analog signal to the A/D converter A/D 1 of the CPU 21 as a second angular velocity vy.

The third amplifier 28c amplifies the signal representing the pitch angular velocity, whose low-frequency component has been reduced, and outputs the analog signal to the A/D converter A/D 2 of the CPU 21 as a third angular velocity vθ.

The reduction of the low-frequency component is a two-step process. The primary part of the analog high-pass filter processing operation is performed first by the first, second, and third high-pass filter circuits 27a, 27b, and 27c, followed by the secondary part of the digital high-pass filter processing operation that is performed by the CPU 21.

The cut-off frequency of the secondary part of the digital high-pass filter processing operation is higher than that of the primary part of the analog high-pass filter processing operation.

In the digital high-pass filter processing operation, the value of time constants (a first high-pass filter time constant hx, a second high-pass filter time constant hy, and a third high-pass filter time constant hθ) can be easily changed.

The supply of electric power to the CPU 21 and each part of the angular velocity detection unit 25 begins after the PON switch 11a is set to the ON state (i.e. when the main power supply is set to the ON state). The calculation of a hand-shake quantity begins after the PON switch 11a is set to the ON state.

The CPU 21 converts the first angular velocity vx, which is input to the A/D converter A/D 0, to a first digital angular velocity signal $Vx_n$ (A/D conversion operation). It also calculates a first digital angular velocity $VVx_n$ by reducing the low-frequency component of the first digital angular velocity signal $Vx_n$ (the digital high-pass filter processing operation) because the low-frequency component of the first digital angular velocity signal $Vx_n$ includes signal elements that are based on null voltage and panning motion, neither of which are related to hand-shake. It also calculates a hand shake quantity (a hand-shake displacement angle: a first digital displacement angle $Kx_n$ caused by yaw) by integrating the first digital angular velocity $VVx_n$ (the integration processing operation).

Similarly, the CPU 21 converts the second angular velocity vy, which is input to the A/D converter A/D 1, to a second digital angular velocity signal $Vy_n$ (A/D conversion operation). It also calculates a second digital angular velocity $VVy_n$ by reducing the low-frequency component of the second digital angular velocity signal $Vy_n$ (the digital high-pass filter processing operation) because the low-frequency component of the second digital angular velocity signal $Vy_n$ includes signal elements that are based on null voltage and panning motion, neither of which are related to hand-shake. It also calculates a hand shake quantity (a hand-shake displacement angle: a second digital displacement angle $Ky_n$ caused by pitch) by integrating the second digital angular velocity $VVy_n$ (the integration processing operation).

Furthermore, the CPU 21 converts the third angular velocity vθ, which is input to the A/D converter A/D 2, to a third digital angular velocity signal $V\theta_n$ (A/D conversion operation). It also calculates a third digital angular velocity $VV\theta_n$ by reducing the low-frequency component of the third digital angular velocity signal $V\theta_n$ (the digital high-pass filter processing operation) because the low-frequency component of the third digital angular velocity signal $V\theta_n$ includes signal elements that are based on null voltage and panning motion, neither of which are related to hand-shake. It also calculates a hand shake quantity (a hand-shake displacement angle: a third digital displacement angle $K\theta_n$ caused by roll) by integrating the third digital angular velocity $VV\theta_n$ (the integration processing operation).

Accordingly, the CPU 21 and the angular velocity detection unit 25 have a function for calculating the hand-shake quantity.

The value "n" is an integer that is greater than 0, and indicates a length of time (ms) from the point when the interrupt process of the timer commences, (t=0, and see step S12 in FIG. 4) to the point when the last anti-shake operation was performed (t=n).

Figure 6:
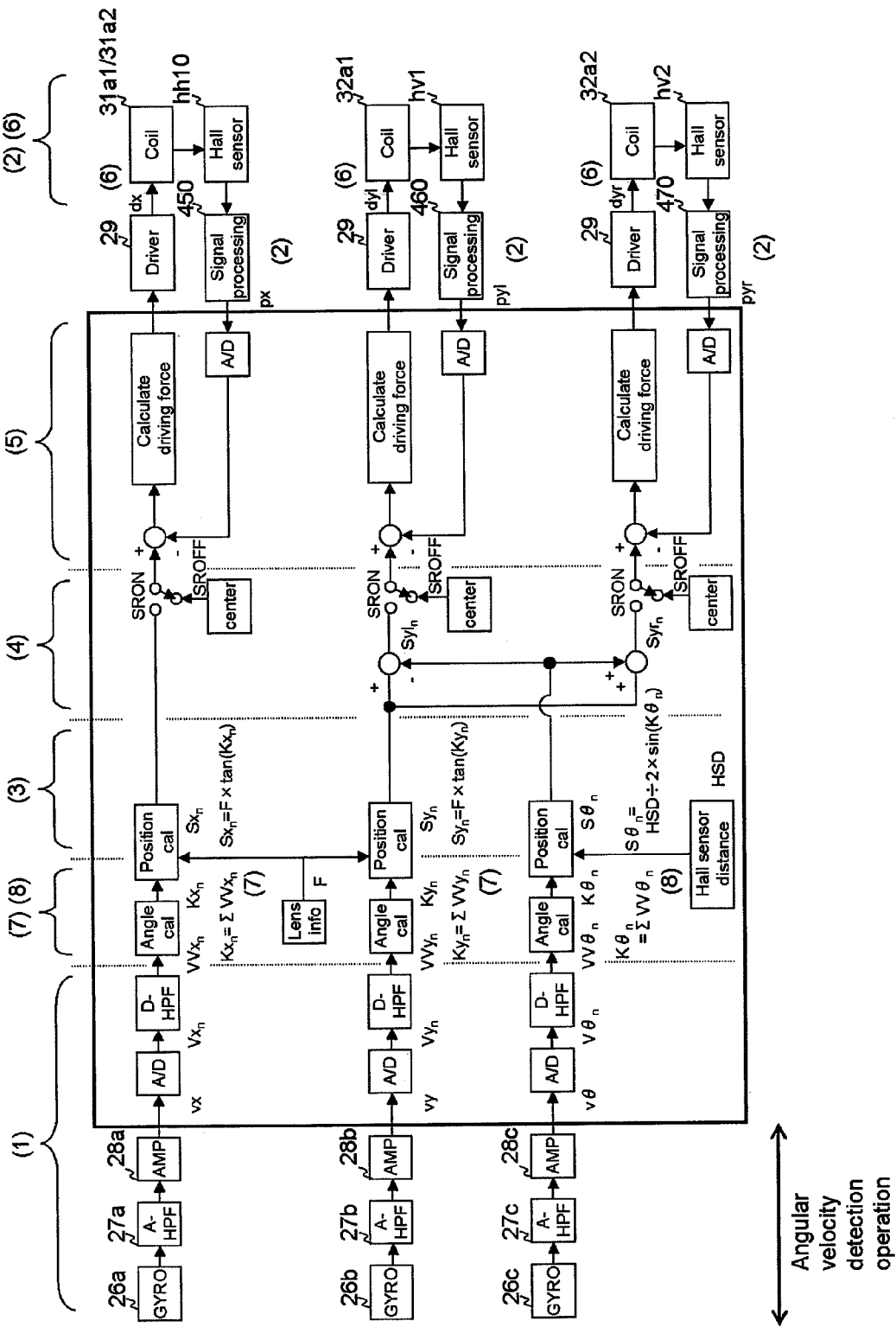
FIG. 6 illustrates calculations in the anti-shake operation.

In the digital high-pass filter processing operation regarding the yaw, the first digital angular velocity $VVx_n$ is calculated by dividing the sum of the first digital angular velocity $VVx_0$ and $VVx_{n-1}$ (calculated by the interrupt process of the timer before the 1 ms predetermined time interval, before the last anti-shake operation was performed), by the first high-pass filter time constant hx, and then subtracting the resulting quotient from the first digital angular velocity signal $Vx_n$ ($VVx_n = Vx_n - (\Sigma VVx_{n-1}) \div hx$, see (1) in FIG. 6).

In the digital high-pass filter processing operation regarding the pitch, the second digital angular velocity $VVy_n$ is calculated by dividing the sum of the second digital angular velocity $VVy_0$ and $VVy_{n-1}$ (calculated by the interrupt process of the timer before the 1 ms predetermined time interval, before the last anti-shake operation was performed), by the second high-pass filter time constant hy, and then subtracting the resulting quotient from the second digital angular velocity signal $Vy_n$ ($VVy_n = Vy_{n-1} - (\Sigma VVy_{n-1}) \div hy$).

In the digital high-pass filter processing operation regarding the roll, the third digital angular velocity $VV\theta_n$ is calculated by dividing the sum of the third digital angular velocity $VV\theta_0$ and $VV\theta_{n-1}$ (calculated by the interrupt process of the timer before the 1 ms predetermined time interval, before the last anti-shake operation was performed), by the third high-pass filter time constant $h\theta$, and then subtracting the resulting quotient from the third digital angular velocity signal $V\theta_n$ ($VV\theta_n = V\theta_n - (\Sigma VV\theta_{n-1}) \div h\theta$).

In the embodiment, the angular velocity detection operation during (a portion of) the interrupt process of the timer includes a process in the angular velocity detection unit 25 and a process of inputting process of the first, second, and third angular velocities vx, vy, and $v\theta$ from the angular velocity detection unit 25 to the CPU 21.

In the integration processing operation regarding the yaw, the first digital displacement angle $Kx_n$ is calculated by summing the first digital angular velocity $VVx_0$ at the point when the interrupt process of the timer commences, t=0, (see step S12 in FIG. 4) and the first digital angular velocity $VVx_n$ at the point when the last anti-shake operation was performed (t=n), ($Kx_n = \Sigma VVx_n$, see (7) in FIG. 6).

Similarly, in the integration processing operation regarding the pitch, the second digital displacement angle $Ky_n$ is calculated by summing the second digital angular velocity $VVy_0$ at the point when the interrupt process of the timer commences and the second digital angular velocity $VVy_n$ at the point when the last anti-shake operation was performed ($Ky_n = \Sigma VVy_n$, see (7) in FIG. 6).

Further, in the integration processing operation regarding the roll, the third digital displacement angle $K\theta_n$ is calculated by summing the third digital angular velocity $VV\theta_0$ at the point when the interrupt process of the timer commences and the third digital angular velocity $VV\theta_n$ at the point when the last anti-shake operation was performed ($K\theta_n = \Sigma VV\theta_n$, see (8) in FIG. 6).

The CPU 21 calculates the position $S_n$ where the imaging unit 39a (the movable unit 30a) should be moved, corresponding to the hand-shake quantity (the first, second, and third digital displacement angles $Kx_n$, $Ky_n$, and $K\theta_n$) calculated for the first direction x, the second direction y, and the rotational direction, based on the lens coefficient F and the hall sensor distance coefficient HSD ($Sx_n = F \times \tan(Kx_n)$, $Sy_n = F \times \tan(Ky_n)$, $S\theta_n = HSD \div 2 \times \sin(K\theta_n)$, see (3) in FIG. 6). In this calculation, not only the linear movement of the movable unit 30a on the xy plane but also the rotation of the movable unit 30a on the xy plane is considered.

The horizontal direction component of the position $S_n$ is defined as $Sx_n$, the vertical direction component of the position $S_n$ is defined as $Sy_n$, and the rotational (inclination) direction component of the position $S_n$ is defined as $S\theta_n$.

The rotation of the movable unit 30a is performed by applying different forces in the second direction y on a first driving point and a second driving point on the movable unit 30a. The movement of the movable unit 30a in the second direction y is performed by applying the same driving forces in the second direction y on the first and second driving points on the movable unit 30a. The first driving point is the point to which a first vertical electro-magnetic force based on the first vertical coil 32a1 is applied. The second driving point is the point to which a second vertical electro-magnetic force based on the second vertical coil 32a2 is applied. The first driving point is set to a position close to the first vertical hall sensor hv1. The second driving point is set to a position close to the second vertical hall sensor hv2.

The first vertical direction component of the first driving point corresponding to the position $S_n$ is defined as $Syl_n$. The second vertical direction component of the second driving point corresponding to the position $S_n$ is defined as $Syr_n$.

The first vertical direction component of the first driving point, $Syl_n$, and the second vertical direction component of the second driving point, $Syr_n$, are calculated on the basis of the vertical direction component of the position $S_n$, $Sy_n$, and the rotational direction component of the position $S_n$, $S\theta_n$, ($Syl_n = Sy_n + S\theta_n$, $Syr_n = Sy_n - S\theta_n$, see (4) in FIG. 6).

Figure 5:
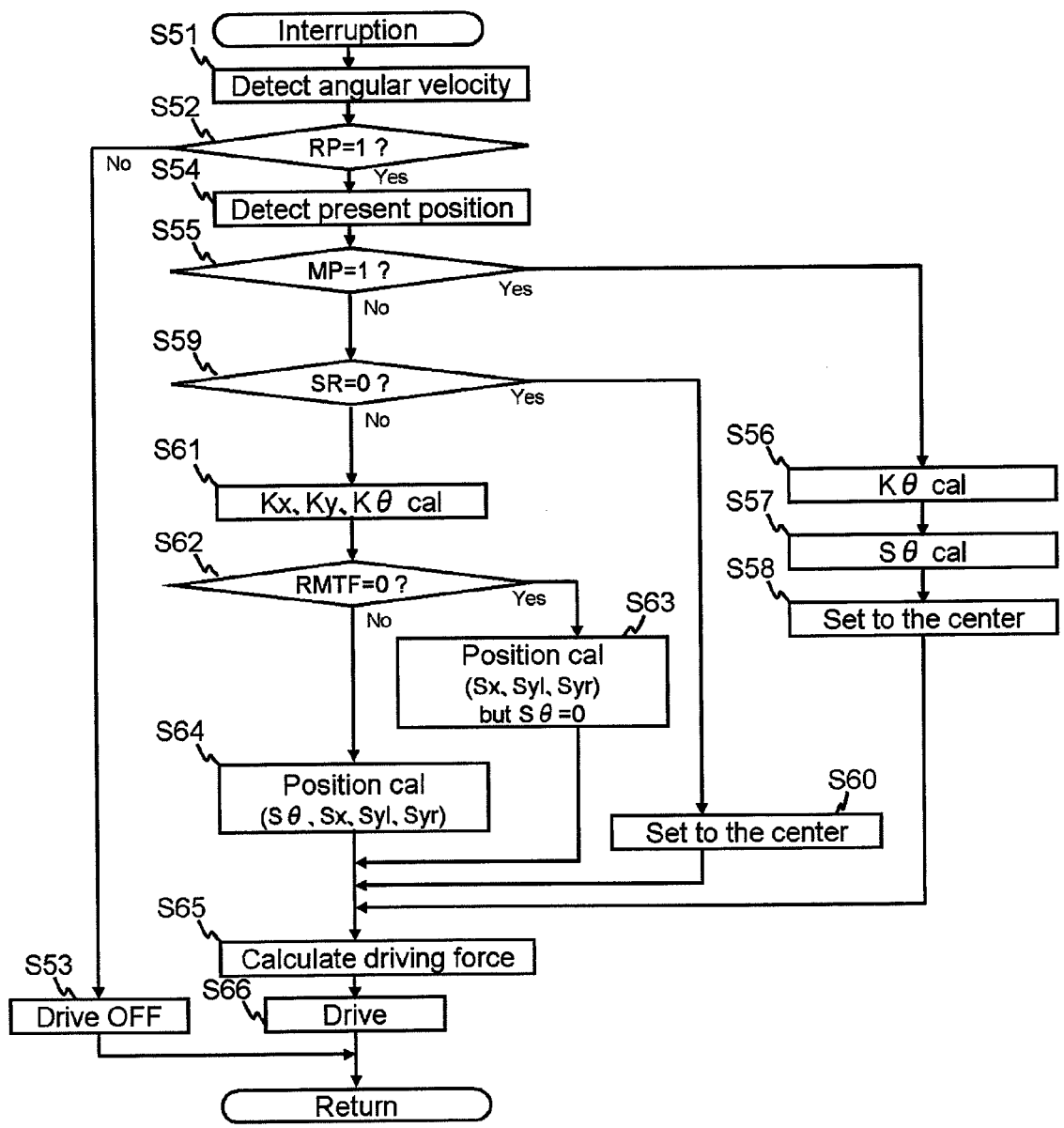
FIG. 5 is a flowchart that shows the detail of the interrupt process of the timer.

The calculations of the first digital displacement angle $Kx_n$, the second digital displacement angle $Ky_n$, the horizontal direction component of the position $S_n$, $Sx_n$, the vertical direction component of the position $S_n$, $Sy_n$, the first vertical direction component of the first driving point, $Syl_n$, and the second vertical direction component of the second driving point, $Syr_n$ are performed only during the first period, under the condition where the anti-shake parameter SR is set to 1 (see steps S61, S63, and S64 of FIG. 5).

The first period commences when the mirror-up operation is finished; in other words, when the value of the mirror state parameter MP has changed from 1 to 0 after the release button 13 is fully depressed so that the release switch 13a is set to the ON state.

The first period is finished when the release sequence is finished; in other words, when the value of the release-state parameter RP has changed from 1 to 0.

In sum, the calculations of the first digital displacement angle $Kx_n$, the second digital displacement angle $Ky_n$, the horizontal direction component of the position $S_n$, $Sx_n$, the vertical direction component of the position $S_n$, $Sy_n$, the first vertical direction component of the first driving point, $Syl_n$, and the second vertical direction component of the second driving point, $Syr_n$ commence immediately before the shutter is opened and the exposure operation commences. Therefore, in the embodiment, the movement of the movable unit 30a commences in accordance with the calculations of the first digital displacement angle $Kx_n$ etc., immediately before the shutter is opened and the exposure operation commences.

On the other hand, a parallax may arise between the position of the movable unit including the imaging device 39a1 at the time point when the release button 13 is fully depressed and the position of the movable unit including the imaging device 39a1 at the time point when the exposure operation commences, if the movement of the movable unit 30a commences immediately after the release button 13 is fully depressed.

However, in the embodiment, this parallax can be reduced, because the movable unit 30a is not moved until the mirror-up operation is finished immediately before the commencement of the exposure operation.

The calculation of the third digital displacement angle $K\theta_n$ is performed after the release switch 13a is set to the ON state. Therefore, the timing of the commencement of the calculation of the third digital displacement angle $K\theta_n$ does not relate to the mirror-up operation. In other words, it does not relate to the value of the mirror state parameter MP (see steps S56 and S61 of FIG. 5). However, when the photographing device 1 is in the non-anti-shake mode, the calculation of the third digital displacement angle $K\theta_n$ is not performed after the completion of the mirror-up operation (see step S60 of FIG. 5).

The calculation of the rotational direction component of the position $S_n$, $S\theta_n$, is performed after the release switch 13a is set to the ON state. Therefore, the timing of the commencement of the position $S_n$, $S\theta_n$, does not relate to the mirror-up operation. In other words, it does not relate to the value of the mirror state parameter MP (see steps S57 and S64 of FIG. 5). However, when the photographing device 1 is in the non-anti-shake mode, the calculation of the rotational direction component of the position $S_n$, $S\theta_n$, is not performed after the completion of the mirror-up operation (see step S60 of FIG. 5).

Figure 8:
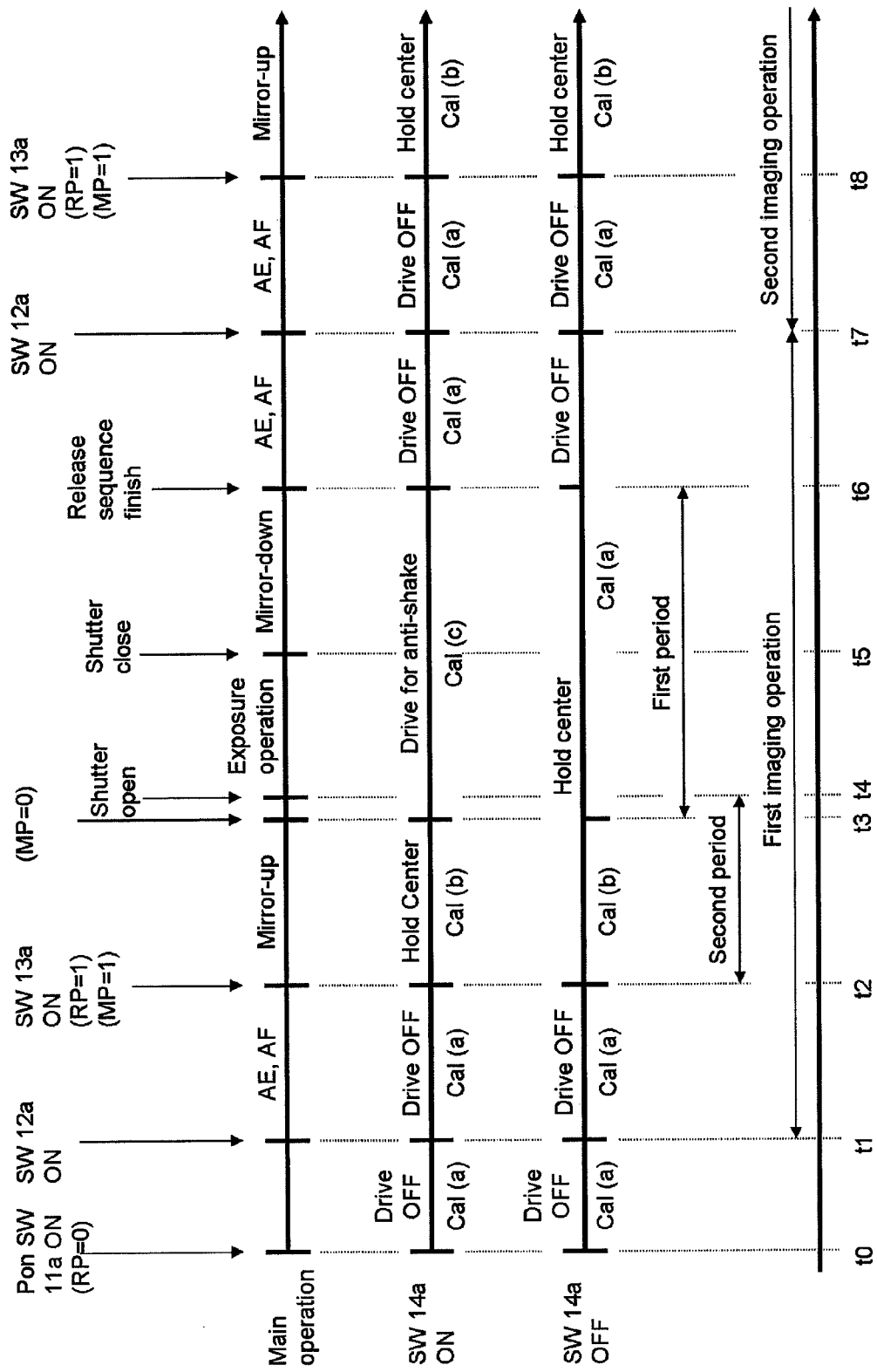
FIG. 8 is a timing chart of the main operation of the photographing device and the anti-shake operation.

While the full depression of the release button 13 for activating the ON state of the release switch 13a and the mirror-up operation are performed, in other words, during a second period from when the release button 13 is fully depressed to when the exposure operation commences, the hand-shake caused by roll tends to occur, in other words, the hand-shake angle caused by roll (the third digital displacement angle $K\theta_n$) tends to increase (see time points t2 to t4 of FIG. 8).

In the embodiment, because the hand-shake caused by roll in the second period, in which the hand-shake caused by roll tends to occur, is considered for the anti-shake operation, the hand-shake quantity, in particular, the hand-shake angle caused by roll, that is, the third digital displacement angle $K\theta_n$, can be accurately calculated.

The hand-shake caused by roll influences the rotation of the movable unit 30a in the anti-shake operation, but does not influence the linear movement of the movable unit 30a in the anti-shake operation. The rotation of the movable unit 30a in the anti-shake operation does not affect the parallax.

However, the calculation of the rotational direction component of the position $S_n$, $S\theta_n$, is not performed when the value of the lens resolution parameter RMTF is 0, even if the photographing device 1 is in the anti-shake mode. This is because the resolution at the edge of the camera lens 67 is low, so that the result of the anti-shake operation for correcting hand-shake caused by roll is ineffective, in other words, the effect of the anti-shake operation for correcting hand-shake caused by roll can not be visually confirmed. Moreover, correcting for roll would reduce the range of movement of the movable unit 30a for correcting hand-shake caused by pitch and yaw.

The movement of the movable unit 30a, which includes the imaging unit 39a, is performed by using an electro-magnetic force and is described later.

The driving force $D_n$ is for driving the driver circuit 29 in order to move the movable unit 30a to the position $S_n$.

The horizontal direction component of the driving force $D_n$ for the first and second horizontal coils 31a1 and 31a2 is defined as the horizontal driving force $Dx_n$ (after D/A conversion, the horizontal PWM duty dx).

The vertical direction component of the driving force $D_n$ for the first vertical coil 32a1 is defined as the first vertical driving force $Dyl_n$ (after D/A conversion, the first vertical PWM duty dyl).

The vertical direction component of the driving force $D_n$ for the second vertical coil 32a2 is defined as the second vertical driving force $Dyr_n$ (after D/A conversion, the second vertical PWM duty dyr).

The anti-shake unit 30 is an apparatus that corrects for effects of hand-shake by moving and rotating the imaging unit 39a to the position $S_n$, by canceling the lag of the photographing subject image on the imaging surface of the imaging device 39a1 of the imaging unit 39a, and by stabilizing the photographing subject image displayed on the imaging surface of the imaging device 39a1, during the first period including the exposure time and when the anti-shake operation is performed (i.e., SR=1).

The anti-shake unit 30 has a fixed unit 30b and a movable unit 30a which includes the imaging unit 39a and can be moved about on the xy plane.

During the first period and when the anti-shake operation is not performed (i.e., SR=0), the movable unit 30a is fixed to (held at) a predetermined position. In the embodiment, this predetermined position is at the center of the range of movement.

The driving of the movable unit 30a of the anti-shake unit 30, including movement to a predetermined fixed (held) position, is performed by the electro-magnetic force of the coil unit and the magnetic unit, through the driver circuit 29 which has the horizontal PWM duty dx input from the PWM 0 of the CPU 21, the first vertical PWM duty dyl input from the PWM 1 of the CPU 21, and the second vertical PWM duty dyr input from the PWM 2 of the CPU 21 (see (6) in FIG. 6).

The detected-position $P_n$ of the movable unit 30a, either before or after the movement effected by the driver circuit 29, is detected by the hall sensor unit 44a and the hall-sensor signal-processing unit 45.

Information regarding the horizontal direction component of the detected-position $P_n$, in other words, the horizontal detected-position signal px, is input to the A/D converter A/D 3 of the CPU 21 (see (2) in FIG. 6). The horizontal detected-position signal px is an analog signal that is converted to a digital signal by the A/D converter A/D 3 (A/D conversion operation). The horizontal direction component of the detected-position $P_n$ after the A/D conversion operation, is defined as $pdx_n$ and corresponds to the horizontal detected-position signal px.

Information regarding one of the vertical direction components of the detected-position $P_n$, in other words, the first vertical detected-position signal pyl, is input to the A/D converter A/D 4 of the CPU 21. The first vertical detected-position signal pyl is an analog signal that is converted to a digital signal by the A/D converter A/D 4 (A/D conversion operation). The first vertical direction component of the detected-position $P_n$ after the A/D conversion operation is defined as $pdyl_n$ and corresponds to the first vertical detected-position signal pyl.

Information regarding the other of the vertical direction components of the detected-position $P_n$, in other words, the second vertical detected-position signal pyr, is input to the A/D converter A/D 5 of the CPU 21. The second vertical detected-position signal pyr is an analog signal that is converted to a digital signal by the A/D converter A/D 5 (A/D conversion operation). The second vertical direction component of the detected-position $P_n$ after the A/D conversion operation is defined as $pdyr_n$ and corresponds to the second vertical detected-position signal pyr.

The PID (Proportional Integral Differential) control calculates the horizontal driving force $Dx_n$ and the first and second vertical driving forces $Dyl_n$ and $Dyr_n$ on the basis of the coordinate data for the detected-position $P_n$ ($pdx_n$, $pdyl_n$, $pdyr_n$) and the position $S_n$ ($Sx_n$, $Syl_n$, $Syr_n$) following movement (see (5) in FIG. 6).

Driving of the movable unit 30a to the position $S_n$, ($Sx_n$, $Syl_n$, $Syr_n$) corresponding to the anti-shake operation of the PID control, is performed when the photographing device 1 is in the anti-shake mode (SR=1), when the anti-shake switch 14a is set to the ON state, and during the first period including the exposure time.

During the mirror-up operation from when the value of the mirror state parameter MP is set to 1, to when the value of the mirror state parameter MP is changed from 1 to 0, PID control unrelated to the anti-shake operation is performed so that the movable unit 30a is moved to the center of the range of movement (the predetermined position) such that the four sides that compose the outline of the imaging surface of the imaging device 39a1 of the imaging unit 39a are parallel to the first direction x or the second direction y, in other words, that the movable unit 30a is not rotated (inclined).

When the anti-shake parameter SR is 0 and during the first period including the exposure time, PID control unrelated to the anti-shake operation is performed so that the movable unit 30a is moved to the center of the range of movement (the predetermined position) such that the four sides that compose the outline of the imaging surface of the imaging device 39a1 of the imaging unit 39a are parallel to the first direction x or the second direction y, in other words, that the movable unit 30a is not rotated (inclined).

Except for the period during the mirror-up operation and the first period, the movable unit 30a is not driven (moved).

The movable unit 30a has a coil unit for driving that is comprised of a first horizontal coil 31a1, a second horizontal coil 31a2, a first vertical coil 32a1, and a second vertical coil 32a2, an imaging unit 39a having the imaging device 39a1, and a hall sensor unit 44a as a magnetic-field change-detecting element unit. In the embodiment, the imaging device 39a1 is a CCD; however, the imaging device 39a1 may be of another type, such as a CMOS, etc.

The fixed unit 30b has a magnetic driving unit that is comprised of a first horizontal magnet 411b1, a second horizontal magnet 411b2, a first vertical magnet 412b1, a second vertical magnet 412b2, a first horizontal yoke 431b1, a second horizontal yoke 431b2, a first vertical yoke 432b1, and a second vertical yoke 432b2.

The fixed unit 30b movably and rotatably supports the movable unit 30a in the range of movement on the xy plane, using balls, etc.

When the center area of the imaging device 39a1 is intersected by the optical axis LX of the camera lens 67, the relationship between the position of the movable unit 30a and the position of the fixed unit 30b is arranged so that the movable unit 30a is positioned at the center of its range of movement in both the first direction x and the second direction y, in order to utilize the full size of the imaging range of the imaging device 39a1.

The rectangular form of the imaging surface of the imaging device 39a1 has two diagonal lines. In the embodiment, the center of the imaging device 39a1 is at the intersection of these two diagonal lines.

Furthermore, the movable unit 30a is positioned at the center of its range of movement in both the first direction x and the second direction y, and the four sides that compose the outline of the imaging surface of the imaging device 39a1 are parallel to the first direction x or the second direction y, in an initial state immediately after the release switch 13a is set to the ON state (see step S58 of FIG. 5).

The first horizontal coil 31a1, the second horizontal coil 31a2, the first vertical coil 32a1, the second vertical coil 32a2, and the hall sensor unit 44a are attached to the movable unit 30a.

The first horizontal coil 31a1 forms a seat and a spiral-shaped coil pattern. The coil pattern of the first horizontal coil 31a1 has lines which are parallel to the second direction y, thus creating the first horizontal electro-magnetic force to move the movable unit 30a that includes the first horizontal coil 31a1, in the first direction x.

The first horizontal electro-magnetic force is created by the current direction of the first horizontal coil 31a1 and the magnetic-field direction of the first horizontal magnet 411b1.

The second horizontal coil 31a2 forms a seat and a spiral-shaped coil pattern. The coil pattern of the second horizontal coil 31a2 has lines which are parallel to the second direction y, thus creating the second horizontal electro-magnetic force to move the movable unit 30a that includes the second horizontal coil 31a2, in the first direction x.

The second horizontal electro-magnetic force is created by the current direction of the second horizontal coil 31a2 and the magnetic-field direction of the second horizontal magnet 411b2.

The first vertical coil 32a1 forms a seat and a spiral-shaped coil pattern. The coil pattern of the first vertical coil 32a1 has lines which are parallel to the first direction x, thus creating the first vertical electro-magnetic force to move the movable unit 30a that includes the first vertical coil 32a1, in the second direction y and to rotate the movable unit 30a.

The first vertical electro-magnetic force is created by the current direction of the first vertical coil 32a1 and the magnetic-field direction of the first vertical magnet 412b1.

The second vertical coil 32a2 forms a seat and a spiral-shaped coil pattern. The coil pattern of the second vertical coil 32a2 has lines which are parallel to the first direction x, thus creating the second vertical electro-magnetic force to move the movable unit 30a that includes the second vertical coil 32a2, in the second direction y and to rotate the movable unit 30a.

The second vertical electro-magnetic force is created by the current direction of the second vertical coil 32a2 and the magnetic-field direction of the second vertical magnet 412b2.

The first and second horizontal coils 31a1 and 31a2 and the first and second vertical coils 32a1 and 32a2 are connected to the driver circuit 29, which drives the first and second horizontal coils 31a1 and 31a2 and the first and second vertical coils 32a1 and 32a2, through the flexible circuit board (not depicted).

The horizontal PWM duty dx, that is a duty ratio of a PWM pulse, is input to the driver circuit 29 from the PWM 0 of the CPU 21. The first vertical PWM duty dyl, that is a duty ratio of a PWM pulse, is input to the driver circuit 29 from the PWM 1 of the CPU 21. The second vertical PWM duty dyr, that is a duty ratio of a PWM pulse, is input to the driver circuit 29 from the PWM 2 of the CPU 21.

The driver circuit 29 supplies the same power to the first and second horizontal coils 31a1 and 31a2, corresponding to the value of the horizontal PWM duty dx, to move the movable unit 30a in the first direction x.

The driver circuit 29 supplies power to the first vertical coil 32a1 corresponding to the value of the first vertical PWM duty dyl and to the second vertical coil 32a2 corresponding to the value of the second vertical PWM duty dyr, in order to move the movable unit 30a in the second direction y and to rotate the movable unit 30a.

The positional relationship between the first and second horizontal coils 31a1 and 31a2 is determined so that the optical axis LX is located between the first and second horizontal coils 31a1 and 31a2 in the first direction x, in the initial state. In other words, the first and second horizontal coils 31a1 and 31a2 are arranged in a symmetrical position centered on the optical axis LX, in the first direction x in the initial state.

The first and second vertical coils 32a1 and 32a2 are arranged in the first direction x in the initial state.

The first and second horizontal coils 31a1 and 31a2 are arranged such that the distance between the center of the imaging device 39a1 and the center area of the first horizontal coil 31a1 in the first direction x is the same as the distance between the center of the imaging device 39a1 and the center area of the second horizontal coil 31a2 in the first direction x.

The first and second vertical coils 32a1 and 32a2 are arranged such that in the initial state, the distance between the center of the imaging device 39a1 and the center area of the first vertical coil 32a1 in the second direction y is the same as the distance between the center of the imaging device 39a1 and the center area of the second vertical coil 32a2 in the second direction y.

The first horizontal magnet 411b1 is attached to the movable unit side of the fixed unit 30b, where the first horizontal magnet 411b1 faces the first horizontal coil 31a1 and the horizontal hall sensor hh10 in the third direction z.

The second horizontal magnet 411b2 is attached to the movable unit side of the fixed unit 30b, where the second horizontal magnet 411b2 faces the second horizontal coil 31a2 in the third direction z.

The first vertical magnet 412b1 is attached to the movable unit side of the fixed unit 30b, where the first vertical magnet 412b1 faces the first vertical coil 32a1 and the first vertical hall sensor hv1 in the third direction z.

The second vertical magnet 412b2 is attached to the movable unit side of the fixed unit 30b, where the second vertical magnet 412b2 faces the second vertical coil 32a2 and the second vertical hall sensor hv2 in the third direction z.

The first horizontal magnet 411b1 is attached to the first horizontal yoke 431b1, such that the N pole and S pole are arranged in the first direction x. The first horizontal yoke 431b1 is attached to the fixed unit 30b, on the side of the movable unit 30a, in the third direction z.

Likewise, the second horizontal magnet 411b2 is attached to the second horizontal yoke 431b2, such that the N pole and S pole are arranged in the first direction x. The second horizontal yoke 431b2 is attached to the fixed unit 30b, on the side of the movable unit 30a, in the third direction z.

The first vertical magnet 412b1 is attached to the first vertical yoke 432b1, such that the N pole and S pole are arranged in the second direction y. The first vertical yoke 432b1 is attached to the fixed unit 30b, on the side of the movable unit 30a, in the third direction z.

Likewise, the second vertical magnet 412b2 is attached to the second vertical yoke 432b2, such that the N pole and S pole are arranged in the second direction y. The second vertical yoke 432b2 is attached to the fixed unit 30b, on the side of the movable unit 30a, in the third direction z.

The first and second horizontal yokes 431b1 and 431b2 are made of a soft magnetic material.

The first horizontal yoke 431b1 prevents the magnetic-field of the first horizontal magnet 411b1 from dissipating to the surroundings, and raises the magnetic-flux density between the first horizontal magnet 411b1 and the first horizontal coil 31a1, and between the first horizontal magnet 411b1 and the horizontal hall sensor hh10.

Similarly, the second horizontal yoke 431b2 prevents the magnetic-field of the second horizontal magnet 411b2 from dissipating to the surroundings, and raises the magnetic-flux density between the second horizontal magnet 411b2 and the second horizontal coil 31a2.

The first and second vertical yokes 432b1 and 432b2 are made of a soft magnetic material.

The first vertical yoke 432b1 prevents the magnetic-field of the first vertical magnet 412b1 from dissipating to the surroundings, and raises the magnetic-flux density between the first vertical magnet 412b1 and the first vertical coil 32a1, and between the first vertical magnet 412b1 and the first vertical hall sensor hv1.

Likewise, the second vertical yoke 432b2 prevents the magnetic-field of the second vertical magnet 412b2 from dissipating to the surroundings, and raises the magnetic-flux density between the second vertical magnet 412b2 and the second vertical coil 32a2, and between the second vertical magnet 412b2 and the second vertical hall sensor hv2.

The first and second horizontal yokes 431b1 and 431b2 and the first and second vertical yokes 432b1 and 432b2 may be composed of one body or separate bodies.

The hall sensor unit 44a is a one-axis hall sensor with three component hall sensors that are magnetoelectric converting elements (magnetic-field change-detecting elements) using the Hall Effect. The hall sensor unit 44a detects the horizontal detected-position signal px, the first vertical detected-position signal pyl, and the second vertical detected-position signal pyr.

One of the three hall sensors is a horizontal hall sensor hh10 for detecting the horizontal detected-position signal px, and another of the three hall sensors is a first vertical hall sensor hv1 for detecting the first vertical detected-position signal pyl, with the third being a second vertical hall sensor hv2 for detecting the second vertical detected-position signal pyr.

The horizontal hall sensor hh10 is attached to the movable unit 30a, where the horizontal hall sensor hh10 faces the first horizontal magnet 411b1 of the fixed unit 30b in the third direction z.

Figure 7:
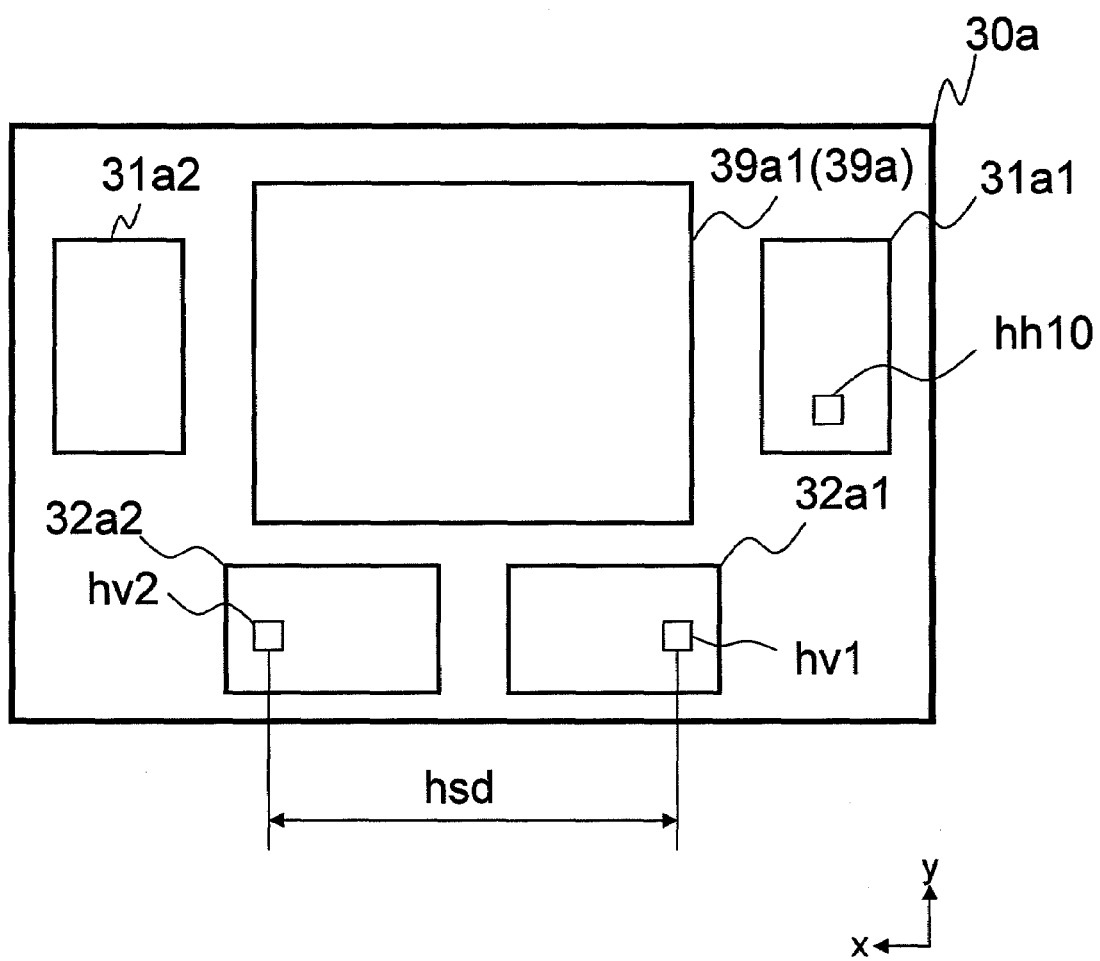
FIG. 7 is a construction diagram of the movable unit.

The horizontal hall sensor hh10 may be arranged outside the spiral shape of the winding of the first horizontal coil 31a1 in the second direction y. However, it is desirable for the horizontal hall sensor hh10 to be arranged inside the spiral shape of the winding of the first horizontal coil 31a1, midway along the outer circumference of the spiral shape of the winding of the first horizontal coil 31a1 in the first direction x (see FIG. 7).

The horizontal hall sensor hh10 is layered on the first horizontal coil 31a1 in the third direction z. Accordingly, the area in which the magnetic-field is generated for the position-detecting operation and the area in which the magnetic-field is generated for driving the movable unit 30a are shared. Therefore, the length of the first horizontal magnet 411b1 in the second direction y and the length of the first horizontal yoke 431b1 in the second direction y can be shortened.

The first vertical hall sensor hv1 is attached to the movable unit 30a, where the first vertical hall sensor hv1 faces the first vertical magnet 412b1 of the fixed unit 30b in the third direction z.

The second vertical hall sensor hv2 is attached to the movable unit 30a, where the second vertical hall sensor hv2 faces the second vertical magnet 412b2 of the fixed unit 30b in the third direction z.

Similarly, the first vertical hall sensor hv1 may be arranged outside the spiral shape of the winding of the first vertical coil 32a1 in the first direction x. However, it is desirable for the first vertical hall sensor hv1 to be arranged inside the spiral shape of the winding of the first vertical coil 32a1, midway along the outer circumference of the spiral shape of the winding of the first vertical coil 32a1 in the second direction y.

The first vertical hall sensor hv1 is layered on the first vertical coil 32a1 in the third direction z. Accordingly, the area in which the magnetic-field is generated for the position-detecting operation and the area in which the magnetic-field is generated for driving the movable unit 30a are shared. Therefore, the length of the first vertical magnet 412b1 in the first direction x and the length of the first vertical yoke 432b1 in the first direction x can be shortened.

The second vertical hall sensor hv2 may be arranged outside the spiral shape of the winding of the second vertical coil 32a2 in the first direction x. However, it is desirable for the second vertical hall sensor hv2 to be arranged inside the spiral shape of the winding of the second vertical coil 32a2, midway along the outer circumference of the spiral shape of the winding of the second vertical coil 32a2 in the second direction y.

The second vertical hall sensor hv2 is layered on the second vertical coil 32a2 in the third direction z. Accordingly, the area in which the magnetic-field is generated for the position-detecting operation and the area in which the magnetic-field is generated for driving the movable unit 30a are shared. Therefore, the length of the second vertical magnet 412b2 in the first direction x and the length of the second vertical yoke 432b2 in the first direction x can be shortened.

Furthermore, the first driving point to which the first vertical electro-magnetic force based on the first vertical coil 32a1 is applied can be close to a position-detecting point by the first vertical hall sensor hv1, and the second driving point to which the second vertical electro-magnetic force based on the second vertical coil 32a2 is applied can be close to a position-detecting point by the second vertical hall sensor hv2. Therefore, accurate driving control of the movable unit 30a can be performed.

In the initial state, it is desirable for the horizontal hall sensor hh10 to be located at a place on the hall sensor unit 44a which faces an intermediate area between the N pole and S pole of the first horizontal magnet 411b1 in the first direction x, as viewed from the third direction z, to perform the position-detecting operation utilizing the full range within which an accurate position-detecting operation can be performed based on the linear output change (linearity) of the one-axis hall sensor.

Similarly, in the initial state, it is desirable for the first vertical hall sensor hv1 to be located at a place on the hall sensor unit 44a which faces an intermediate area between the N pole and S pole of the first vertical magnet 412b1 in the second direction y, as viewed from the third direction z.

Likewise, in the initial state, it is desirable for the second vertical hall sensor hv2 to be located at a place on the hall sensor unit 44a which faces an intermediate area between the N pole and S pole of the second vertical magnet 412b2 in the second direction y, as viewed from the third direction z.

The first hall-sensor signal-processing unit 45 has a first hall-sensor signal-processing circuit 450 and a second hall-sensor signal-processing circuit 460 and a third hall-sensor signal-processing circuit 470.

The first hall-sensor signal-processing circuit 450 detects a horizontal potential difference between the output terminals of the horizontal hall sensor hh10, based on the output signal of the horizontal hall sensor hh10.

The first hall-sensor signal-processing circuit 450 outputs the horizontal detected-position signal px to the A/D converter A/D 3 of the CPU 21, on the basis of the horizontal potential difference. The horizontal detected-position signal px represents the location of the part of the movable unit 30a which has the horizontal hall sensor hh10, in the first direction x.

The first hall-sensor signal-processing circuit 450 is connected to the horizontal hall sensor hh10 through the flexible circuit board (not depicted).

The second hall-sensor signal-processing circuit 460 detects a first vertical potential difference between the output terminals of the first vertical hall sensor hv1, based on the output signal of the first vertical hall sensor hv1.

The second hall-sensor signal-processing circuit 460 outputs the first vertical detected-position signal pyl to the A/D converter A/D 4 of the CPU 21, on the basis of the first vertical potential difference. The first vertical detected-position signal pyl represents the location of the part of the movable unit 30a which has the first vertical hall sensor hv1 (the position-detecting point by the first vertical hall sensor hv1), in the second direction y.

The second hall-sensor signal-processing circuit 460 is connected to the first vertical hall sensor hv1 through the flexible circuit board (not depicted).

The third hall-sensor signal-processing circuit 470 detects a second vertical potential difference between the output terminals of the second vertical hall sensor hv2, based on the output signal of the second vertical hall sensor hv2.

The third hall-sensor signal-processing circuit 470 outputs the second vertical detected-position signal pyr to the A/D converter A/D 5 of the CPU 21, on the basis of the second vertical potential difference. The second vertical detected-position signal pyr represents the location of the part of the movable unit 30a which has the second vertical hall sensor hv2 (the position-detecting point by the second vertical hall sensor hv2), in the second direction y.

The third hall-sensor signal-processing circuit 470 is connected to the second vertical hall sensor hv2 through the flexible circuit board (not depicted).

In the embodiment, the three hall sensors (hh10, hv1 and hv2) are used for specifying the location of the movable unit 30a including the rotational angle.

The locations in the second direction y of the two points on the movable unit 30a are determined by using two of the three hall sensors (hv1 and hv2). The location in the first direction x of the one point on the movable unit 30a is determined by using another of the three hall sensors (hh10). The location of the movable unit 30a which includes the rotational angle on the xy plane, can be determined on the basis of the information regarding the locations in the first direction x of the one point and the location in the second direction y of the two points.

Next, the main operation of the photographing device 1 in the embodiment is explained using the flowchart of FIG. 4.

When the PON switch 11a is set to the ON state, the electrical power is supplied to the angular velocity detection unit 25 so that the angular velocity detection unit 25 is set to the ON state in step S11.

In step S12, the interrupt process of the timer at the predetermined time interval (1 ms) commences. In step S13, the value of the release-state parameter RP is set to 0 (see time point t0 of FIG. 8). The details of the interrupt process of the timer in the embodiment are explained later using the flowchart of FIG. 5.

In step S14, it is determined whether the photometric switch 12a is set to the ON state. When it is determined that the photometric switch 12a is not set to the ON state, the operation returns to step S14 and the process in step S14 is repeated. Otherwise, the operation continues on to step S15 (see time points t1 and t7 of FIG. 8).

In step S15, it is determined whether the anti-shake switch 14a is set to the ON state. When it is determined that the anti-shake switch 14a is not set to the ON state, the value of the anti-shake parameter SR is set to 0 in step S16. Otherwise, the value of the anti-shake parameter SR is set to 1 in step S17.

In step S18, the AE sensor of the AE unit 23 is driven, the photometric operation is performed, and the aperture value and the time length of the exposure operation are calculated.

The AF sensor and the lens control circuit of the AF unit 24 are driven to perform the AF sensing and focus operations, respectively.

In step S19, the lens information including the resolution at the edge of the camera lens 67 and the lens coefficient F is communicated from the camera lens 67 to the CPU 21.

The value of the lens resolution parameter RMTF is set to 1 when the value of the resolution at the edge of the camera lens 67 is greater than the threshold value.

The value of the lens resolution parameter RMTF is set to 0 when the value of the resolution at the edge of the camera lens 67 is not greater than the threshold value.

In step S20, it is determined whether the release switch 13a is set to the ON state. When the release switch 13a is not set to the ON state, the operation returns to step S14 and the process in steps S14 to S19 is repeated. Otherwise, the operation continues on to step S21, and then the release sequence operation commences.

In step S21, the value of the release-state parameter RP is set to 1. In step S22, the value of the mirror state parameter MP is set to 1 (see time points t2 and t8 of FIG. 8).

In step S23, the mirror-up operation and the aperture closing operation corresponding to the aperture value that is either preset or calculated, are performed by the mirror-aperture-shutter unit 18.

After the mirror-up operation is finished, the value of the mirror state parameter MP is set to 0 (see time point t3 of FIG. 8), in step S24. In step S25, the opening operation of the shutter (the movement of the front curtain of the shutter) commences (see time point t4 of FIG. 8).

In step S26, the exposure operation, that is, the electric charge accumulation of the imaging device 39a1 (CCD etc.), is performed. After the exposure time has elapsed, the closing operation of the shutter (the movement of the rear curtain in the shutter), the mirror-down operation, and the opening operation of the aperture are performed by the mirror-aperture-shutter unit 18, in step S27 (see time point t5 of FIG. 8).

In step S28, the electric charge accumulated in the imaging device 39a1 during the exposure time is read. In step S29, the CPU 21 communicates with the DSP 19 so that the image-processing operation is performed based on the electric charge read from the imaging device 39a1. The image, on which the image-processing operation is performed, is stored in the memory of the photographing device 1. In step S30, the image stored in the memory is displayed on the display 17. In step S31, the value of the release-state parameter RP is set to 0 so that the photometric switch 12a and the release switch 13a are set to the OFF state and the release sequence operation is finished, and the operation then returns to step S14. In other words, the photographing device 1 is returned to a state in which the next imaging operation can be performed (see time point t6 of FIG. 8).

Next, the interrupt process of the timer in the embodiment, which commences in step S12 in FIG. 4 and is performed at every predetermined time interval (1 ms) independent of the other operations, is explained using the flowchart of FIG. 5.

When the interrupt process of the timer commences, the first angular velocity vx, which is output from the angular velocity detection unit 25, is input to the A/D converter A/D 0 of the CPU 21 and converted to the first digital angular velocity signal $Vx_n$, in step S51. The second angular velocity vy, which is also output from the angular velocity detection unit 25, is input to the A/D converter A/D 1 of the CPU 21 and converted to the second digital angular velocity signal $Vy_n$. Similarly, the third angular velocity vθ, which is also output from the angular velocity detection unit 25, is input to the A/D converter A/D 2 of the CPU 21 and converted to the third digital angular velocity signal $Vθ_n$ (the angular velocity detection operation).

The low frequencies of the first, second, and third digital angular velocity signals $Vx_n$, $Vy_n$, and $Vθ_n$ are reduced in the digital high-pass filter processing operation (the first, second, and third digital angular velocities $VVx_n$, $VVy_n$, and $VVθ_n$, see (1) in FIG. 6).

In step S52, it is determined whether the value of the release-state parameter RP is set to 1. When it is determined that the value of the release-state parameter RP is not set to 1, driving the movable unit 30a is set to the OFF state, in other words, the anti-shake unit 30 is set to a state where the driving control of the movable unit 30a is not performed in step S53. Otherwise, the operation proceeds directly to step S54.

Therefore, during the period from the time point t0 of FIG. 8 to the time point t2 of FIG. 8, the period from the time point t6 of FIG. 8 to the time point t7 of FIG. 8, and the period from the time point t7 of FIG. 8 to the time point t8 of FIG. 8, the movable unit 30a is not driven. Instead, during these periods, the calculations of the first, second, and third digital angular velocity $VVx_n$, $VVy_n$, and $VVθ_n$ are performed (the first hand-shake quantity calculation (a)).

In step S54, the hall sensor unit 44a detects the position of the movable unit 30a. The horizontal detected-position signal px and the first and second vertical detected-position signals pyl and pyr are calculated by the hall-sensor signal-processing unit 45. The horizontal detected-position signal px is then input to the A/D converter A/D 3 of the CPU 21 and converted to the digital signal $pdx_n$, the first vertical detected-position signal pyl is then input to the A/D converter A/D 4 of the CPU 21 and converted to the digital signal $pdyl_n$, and the second vertical detected-position signal pyr is input to the A/D converter A/D 5 of the CPU 21 and also converted to the digital signal $pdyr_n$, both of which thus specify the present position $P_n$ ($pdx_n$, $pdyl_n$, $pdyr_n$) of the movable unit 30a (see (2) in FIG. 6).

In step S55, it is determined whether the value of the mirror state parameter MP is set to 1. When it is determined that the value of the mirror state parameter MP is not set to 1, the operation proceeds directly to step S59. Otherwise, the operation continues to step S56.

In step S56, the third digital displacement angle $Kθ_n$ is calculated on the basis of the third digital angular velocity $VVθ_n$ (see (8) in FIG. 6).

In step S57, the rotational direction component of the position $S_n$, $Sθ_n$ is calculated on the basis of the third digital displacement angle $Kθ_n$ and the hall sensor distance coefficient HSD (see (3) in FIG. 6).

However, the calculations of the first digital displacement angle $Kx_n$, the second digital displacement angle $Ky_n$, the horizontal direction component of the position $S_n$, $Sx_n$, and the vertical direction component of the position $S_n$, $Sy_n$ are not performed.

In step S58, the position $S_n$ ($Sx_n$, $Syl_n$, $Syr_n$) where the movable unit 30a (the imaging unit 39a) should be moved is set to the center of the range of movement of the movable unit 30a ($Syl_n = Syr_n$).

Therefore, the rotational direction component of the position $S_n$, $Sθ_n$, which is calculated in step S57, is not used for calculating in step S58. However, the rotational angle (the inclination angle) of the photographing device 1 during the period from when the release switch 13a is set to the ON state to when the mirror-up operation is finished, is calculated as the third digital displacement angle $Kθ_n$, and the movement quantity of the movable unit 30a to correct the inclination angle is calculated as the rotational direction component of the position $S_n$, $Sθ_n$, and it is used for calculation in steps S64 and S65.

Thus, during the period from the time point t2 of FIG. 8 to the time point t3 of FIG. 8, the movable unit 30a is held at the center of its range of movement, and the calculations of the first, second, and third digital angular velocities $VVx_n$, $VVy_n$, and $VV\theta_n$, the third digital displacement angle $K\theta_n$, and the rotational direction component of the position $S_n$, $S\theta_n$ are performed (the second hand-shake quantity calculation (b)).

In step S59, it is determined whether the value of the anti-shake parameter SR is 0. When it is determined that the value of the anti-shake parameter SR is 0 (SR=0), in other words, that the photographing device 1 is not in the anti-shake mode, the position $S_n$ ($Sx_n$, $Syl_n$, $Syr_n$) where the movable unit 30a should be moved is set to the center of the range of movement of the movable unit 30a ($Syl_n$=$Syr_n$), in step S60 (see (4) in FIG. 6).

Thus, during the period from the time point t3 of FIG. 8 to the time point t6 of FIG. 8 and when the photographing device 1 is not in the anti-shake mode, the movable unit 30a is held at the center of its range of movement, and the calculations of the first, second, and third digital angular velocities $VVx_n$, $VVy_n$, and $VV\theta_n$, are performed (the second hand-shake quantity calculation (a)).

When it is determined that the value of the anti-shake parameter SR is not 0 (IS=1), in other words when the photographing device 1 is in anti-shake mode, the first, second, and third digital displacement angles $Kx_n$, $Ky_n$, and $K\theta_n$ are calculated on the basis of the first, second, and third digital angular velocities $VVx_n$, $VVy_n$, and $VV\theta_n$, in step S61 (see (7) and (8) in FIG. 6).

In step S62, it is determined whether the value of the lens resolution parameter RMTF is 0.

When it is determined that the value of the lens resolution parameter RMTF is 0, the horizontal direction component of the position $S_n$, $Sx_n$ and the vertical direction component of the position $S_n$, $Sy_n$ are calculated on the basis of the first digital displacement angle $Kx_n$, the second digital displacement angle $Ky_n$, and the lens coefficient F (see (3) in FIG. 6), in step S63.

However, the rotational direction component of the position $S_n$, $S\theta_n$, is not calculated and is set to 0.

Then, the first vertical direction component of the first driving point $Syl_n$ and the second vertical direction component of the second driving point $Syr_n$ are calculated on the basis of the vertical direction component of the position $S_n$, $Sy_n$ and the rotational direction component of the position $S_n$, $S\theta_n$ ($Syl_n$=$Syr_n$, see (4) in FIG. 6).

When it is determined that the value of the lens resolution parameter RMTF is not 0, the horizontal direction component of the position $S_n$, $Sx_n$ and the vertical direction component of the position $S_n$, $Sy_n$ are calculated on the basis of the first digital displacement angle $Kx_n$, the second digital displacement angle $Ky_n$, and the lens coefficient F (see (3) in FIG. 6), in step S64.

Furthermore, the rotational direction component of the position $S_n$, $S\theta_n$, is calculated on the basis of the third digital displacement angle $K\theta_n$ and the hall sensor distance coefficient HSD (see (3) in FIG. 6).

Then, the first vertical direction component of the first driving point $Syl_n$ and the second vertical direction component of the second driving point $Syr_n$ are calculated on the basis of the vertical direction component of the position $S_n$, $Sy_n$ and the rotational direction component of the position $S_n$, $S\theta_n$ (see (4) in FIG. 6).

Thus, during the period from the time point t3 of FIG. 8 to the time point t6 of FIG. 8, and when the photographing device 1 is in the anti-shake mode, the movable unit 30a is moved to the position $S_n$ where the imaging unit 39a should be moved according to the anti-shake operation, and the calculations of the first, second, and third digital angular velocities $VVx_n$, $VVy_n$, and $VV\theta_n$, the first, second, and third digital displacement angles $Kx_n$, $Ky_n$, and $K\theta_n$, the horizontal direction component of the position $S_n$, $Sx_n$, the vertical direction component of the position $S_n$, $Sy_n$, the rotational direction component of the position $S_n$, $S\theta_n$, the first vertical direction component of the first driving point $Syl_n$, and the second vertical direction component of the second driving point $Syr_n$ are performed (the third hand-shake quantity calculation (c)).

However, when the value of the lens resolution parameter RMTF is 0, the value of the rotational direction component of the position $S_n$, $S\theta_n$, is set to 0 so that the value of the first vertical direction component of the first driving point $Syl_n$ is the same as the value of the second vertical direction component of the second driving point $Syr_n$.

In step S65, the horizontal driving force $Dx_n$ (the horizontal PWM duty dx), the first vertical driving force $Dyl_n$ (the first vertical PWM duty dyl), and the second vertical driving force $Dyr_n$ (the second vertical PWM duty dyr) of the driving force $D_n$, which moves the movable unit 30a to the position $S_n$, are calculated on the basis of the position $S_n$ ($Sx_n$, $Sy_n$, $S\theta_n$) that was determined in step S58, step S60, step S63, or step S64, and the present position $P_n$ ($pdx_n$, $pdyl_n$, $pdyr_n$) (see (5) in FIG. 6).

In step S66, the first and second horizontal coils 31a1 and 31a2 are driven by applying the horizontal PWM duty dx to the driver circuit 29; the first vertical coil 32a1 is driven by applying the first vertical PWM duty dyl to the driver circuit 29; and the second vertical coil 32a2 is driven by applying the second vertical PWM duty dyr to the driver circuit 29, so that the movable unit 30a is moved to position $S_n$ ($Sx_n$, $Sy_n$, $S\theta_n$) (see (6) in FIG. 6).

The process of steps S65 and S66 is an automatic control calculation that is performed by the PID automatic control for performing general (normal) proportional, integral, and differential calculations.

In the embodiment, it is explained that the photographing device 1 has the mirror-up operation. However, even if the photographing device 1 does not have the mirror-up operation, if the length of time from when the release button 13 is fully depressed to when the exposure operation commences is long, a benefit in the embodiment will be obtained. In this case, the calculations of the third digital displacement angle $K\theta_n$ and the rotational direction component of the position $S_n$, $S\theta_n$, are performed from a first time point TP1 after the release switch 13a is set to the ON state, for example the time point t2 immediately after the release switch 13a is set to the ON state etc. Furthermore, the calculations of the first and second digital displacement angles $Kx_n$ and $Ky_n$, the horizontal direction component of the position $S_n$, $Sx_n$, and the vertical direction component of the position $S_n$, $Sy_n$, are performed from a second point TP2 after the first point TP1, for example the time point t3 immediately before the exposure operation commences, etc.

Furthermore, it is explained that whether the anti-shake operation for correcting hand-shake caused by roll is performed or not is controlled on the basis of the resolution at the edge of the camera lens 67. However, not only are the ON/OFF states of the anti-shake operation for correcting hand-shake caused by roll controlled, but the degree of the anti-shake operation for correcting hand-shake caused by roll may also be controlled.

For example, when the value of the resolution at the edge is greater than a first threshold value, the anti-shake operation considering the hand-shake caused 100% by roll, in other words, the first vertical direction component of the first driving point $Syl_n$ and the second vertical direction component of the second driving point $Syr_n$ are calculated under the condition that the rotational direction component of the position $S_n$, $S\theta_n$ is considered to be 100% ($Syl_n=Sy_n+100\%\times S\theta_n$, $Syr_n=Sy_n-100\%\times S\theta_n$).

Furthermore, when the value of the resolution at the edge is greater than a second threshold value that is smaller than the first threshold value, and is not greater than the first threshold value, the anti-shake operation considering the hand-shake caused 50% by roll, in other words, the first vertical direction component of the first driving point $Syl_n$ and the second vertical direction component of the second driving point $Syr_n$ are calculated under the condition that the rotational direction component of the position $S_n$, $S\theta_n$ is considered to be 50% ($Syl_n=Sy_n+50\%\times S\theta_n$, $Syr_n=Sy_n-50\%\times S\theta_n$).

Furthermore, when the value of the resolution at the edge is not greater than the second threshold value, the anti-shake operation considering the hand-shake caused 0% by roll, in other words, the first vertical direction component of the first driving point $Syl_n$ and the second vertical direction component of the second driving point $Syr_n$ are calculated under the condition that the rotational direction component of the position $S_n$, $S\theta_n$ is considered to be 0% ($Syl_n=Sy_n+0\%\times S\theta_n$, $Syr_n=Sy_n-0\%\times S\theta_n$).

Furthermore, it is explained that the hall sensor is used for position detection as the magnetic-field change-detecting element. However, another detection element, an MI (Magnetic Impedance) sensor such as a high-frequency carrier-type magnetic-field sensor, a magnetic resonance-type magnetic-field detecting element, or an MR (Magneto-Resistance effect) element may be used for position detection purposes. When one of either the MI sensor, the magnetic resonance-type magnetic-field detecting element, or the MR element is used, the information regarding the position of the movable unit can be obtained by detecting the magnetic-field change, similar to using the hall sensor.

Although the embodiment of the present invention has been described herein with reference to the accompanying drawings, obviously many modifications and changes may be made by those skilled in this art without departing from the scope of the invention.

The present disclosure relates to subject matter contained in Japanese Patent Application No. 2007-062726 (filed on Mar. 13, 2007), which is expressly incorporated herein by reference, in its entirety.

The invention claimed is:

1. An anti-shake apparatus for image stabilization in a photographing device, comprising:
   a movable unit that has an imaging device and is movable and rotatable for an anti-shake operation; and
   a controller that controls said movable unit for said anti-shake operation;
   said controller obtaining information regarding a resolution at the edge of a lens that is used for an imaging operation of said imaging device, and controlling a degree of said anti-shake operation that is performed for correcting hand-shake caused by roll, on the basis of said resolution at the edge of said lens.

2. The anti-shake apparatus according to claim 1, wherein said anti-shake operation is performed for correcting hand-shake caused by pitch, yaw, and roll when the value of said resolution at the edge of said lens is greater than a threshold value; and
   said anti-shake operation is performed for correcting hand-shake caused by pitch and yaw without considering the hand-shake caused by roll when the value of said resolution at the edge of said lens is not greater than said threshold value.

3. The anti-shake apparatus according to claim 2, further comprising a first magnetic-field change-detecting element and a second magnetic-field change-detecting element that are used for position detection of said movable unit in a specified direction;
   wherein a calculation of a rotational direction component of a position of said movable unit for said anti-shake operation is performed based on a hand-shake angle caused by roll and a relative distance between said first magnetic-field change-detecting element and said second magnetic-field change-detecting element, when the value of said resolution at the edge of said lens is greater than said threshold value; and
   said rotational direction component of said position of said movable unit for said anti-shake operation is set to 0 when the value of said resolution at the edge of said lens is not greater than said threshold value.

4. The anti-shake apparatus according to claim 1, wherein said lens has a memory that stores said information regarding said resolution at the edge of said lens.

5. A photographing device comprising:
   an anti-shake unit that has a movable unit that has an imaging device and is movable and rotatable for an anti-shake operation for image stabilization and a controller that controls said movable unit for said anti-shake operation; and
   a lens that is used for an imaging operation of said imaging device;
   said controller obtaining information regarding a resolution at the edge of said lens, and controlling a degree of said anti-shake operation for correcting hand-shake caused by roll, on the basis of said resolution at the edge of said lens.

* * * * *